United States Patent
Aune et al.

(10) Patent No.: US 6,358,417 B1
(45) Date of Patent: Mar. 19, 2002

(54) NON-WOVEN DEPTH FILTER ELEMENT

(75) Inventors: Thomas M. Aune, Mound; Travis G. Stifter, Brooklyn Park; Donald A. Boothroyd, Bloomington, all of MN (US)

(73) Assignee: Osmonics, Inc., Minnetonka, MN (US)

( * ) Notice: Subject to any disclaimer, the term of this patent is extended or adjusted under 35 U.S.C. 154(b) by 0 days.

(21) Appl. No.: 09/296,070

(22) Filed: Apr. 21, 1999

(51) Int. Cl.[7] .......................... B01D 29/48; B01D 29/58
(52) U.S. Cl. ..................... 210/497.01; 210/500.27; 210/505; 210/508
(58) Field of Search .................. 210/491, 497.01, 210/488–489, 323.2, 500.27, 503–505, 506, 508; 55/485–487, 528; 95/482, 485, 486–488, 524, 527, 528

(56) References Cited

U.S. PATENT DOCUMENTS

| | | | |
|---|---|---|---|
| 3,073,735 A | * 1/1963 | Till et al. | |
| 3,251,475 A | 5/1966 | Till et al. | |
| 3,261,473 A | * 7/1966 | Riede | 210/282 |
| 3,347,391 A | * 10/1967 | Steensen | 210/491 |
| 3,801,400 A | * 4/1974 | Vogt et al. | |
| 3,825,379 A | 7/1974 | Lohkamp et al. | 425/72 |
| 3,825,380 A | 7/1974 | Harding et al. | 425/72 |
| 3,904,798 A | * 9/1975 | Vogt et al. | |
| 3,933,557 A | 1/1976 | Pall | 146/167 |
| 4,021,281 A | 5/1977 | Pall | 156/167 |
| 4,116,738 A | 9/1978 | Pall | 156/167 |
| 4,173,443 A | * 11/1979 | Lin | |
| 4,225,642 A | * 9/1980 | Hirakawa | |
| 4,240,864 A | 12/1980 | Lin | 146/441 |
| 4,594,202 A | 6/1986 | Pall et al. | 264/8 |
| 4,714,647 A | 12/1987 | Shipp, Jr. et al. | 428/212 |
| 4,726,901 A | * 2/1988 | Pall et al. | 210/496 |
| 4,759,782 A | 7/1988 | Miller et al. | 55/487 |
| 4,861,633 A | 8/1989 | Abe | 428/36.3 |
| 5,288,402 A | * 2/1994 | Yoshida | 210/488 |
| 5,340,479 A | * 8/1994 | Szczepanski et al. | 210/497.1 |
| 5,360,545 A | * 11/1994 | Pall et al. | 210/505 |
| 5,366,576 A | 11/1994 | Clack | 156/173 |
| 5,409,642 A | 4/1995 | Allen et al. | 264/6 |
| 5,591,335 A | 1/1997 | Barboza et al. | 210/323.2 |
| 5,783,011 A | 7/1998 | Barboza et al. | 156/167 |

* cited by examiner

Primary Examiner—Matthew O. Savage
Assistant Examiner—Marianne Ocampo
(74) Attorney, Agent, or Firm—Kinney & Lange, P.A.

(57) ABSTRACT

A new non-woven depth filter element is formed in a continuous process whereby a mass of very fine diameter polymer filaments overlaid by mass of larger diameter polymer filaments are continuously accumulated on a spinning mandrel and advanced along and off of the mandrel by a press roller. An inner cylindrical surface of the cumulative filament mass forming the depth filter element is calendered, which facilitates insertion of a core member.

5 Claims, 4 Drawing Sheets

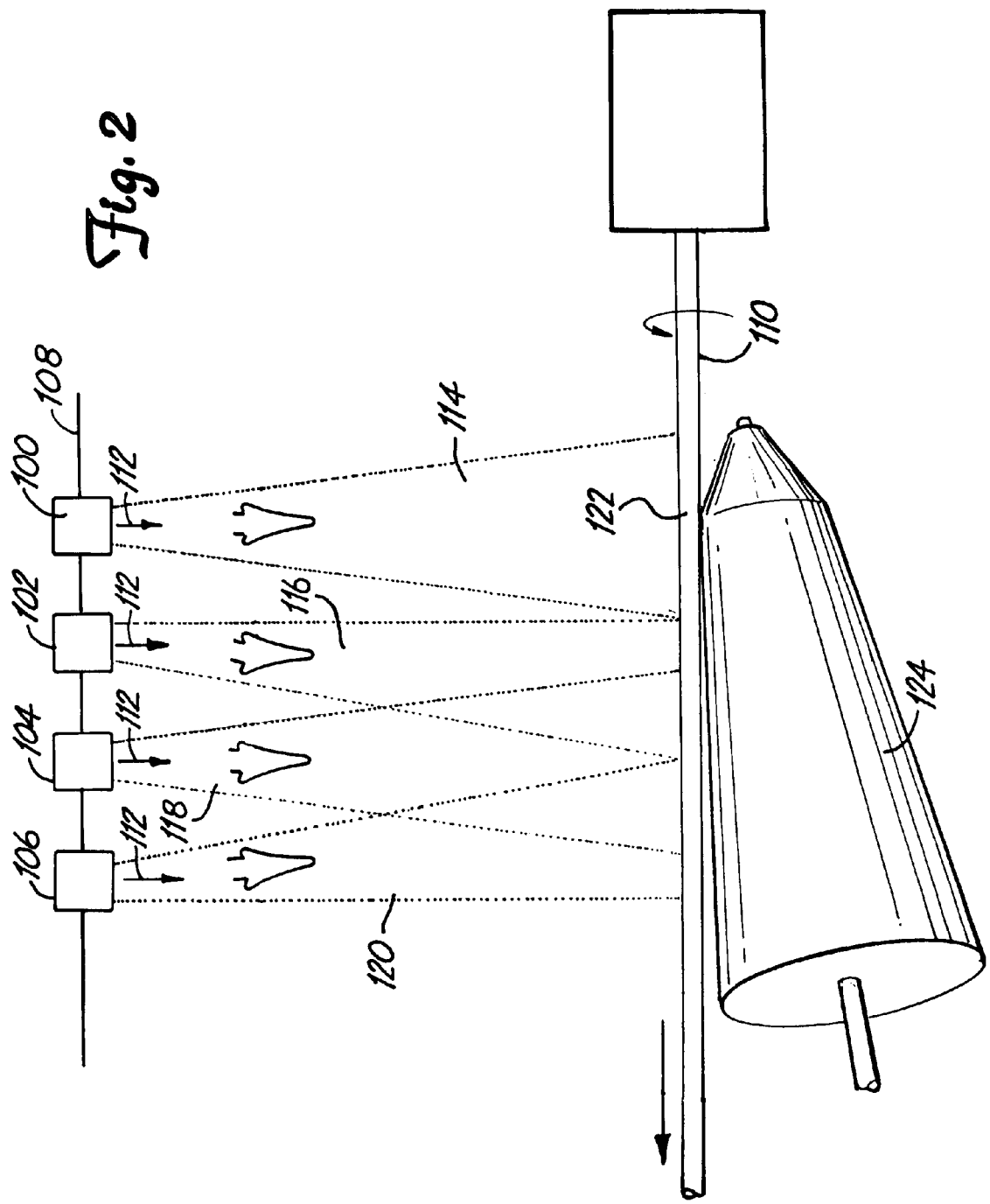

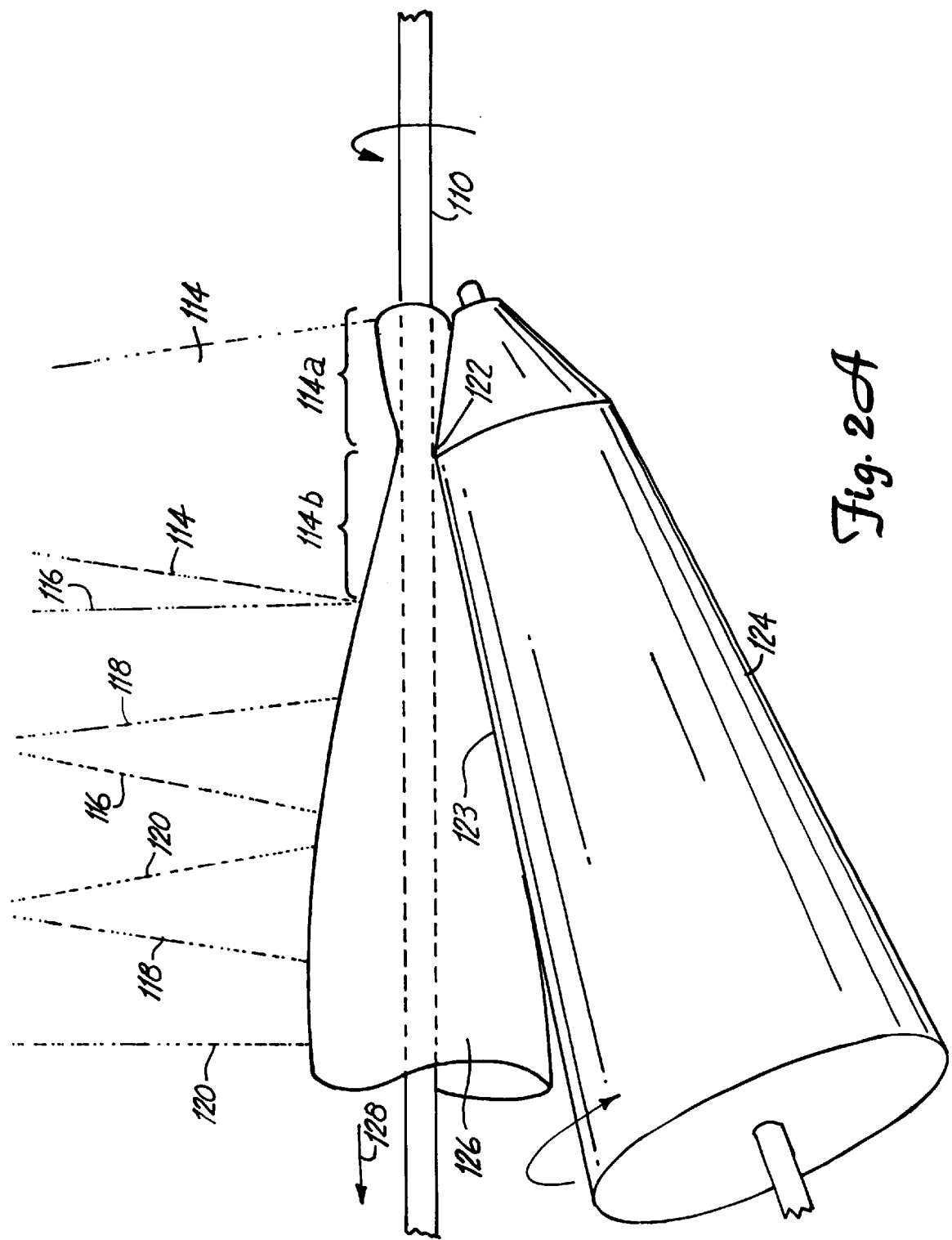

NON-WOVEN DEPTH FILTER ELEMENT

BACKGROUND OF THE INVENTION

The present invention relates to the field of fluid filtration, and in particular to depth filters. Specifically, the present invention relates to depth filters formed from non-woven melt-blown polymeric fibers.

Non-woven melt-blown depth filters are well known and are widely used in fluid filtration applications. Such filters can be formed by extruding softened polymeric materials through an orifice of a nozzle in a stream. Jets of gas (usually air) attenuate the polymer stream to form the fibers, which are directed toward and collected by a rotating mandrel. Fibers continue to build up on the rotating mandrel until a tubular mass of fibers of the desired size and morphology is achieved.

Depth filters of the type described may include a core member to support the fiber mass. Depth filters of this type are typically produced by placing a tubular core member over the mandrel and applying the polymer fibers directly on the core member. This process, however, is discontinuous and requires that a core member be replaced on the mandrel after each depth filter is formed.

A continuous process for producing a coreless depth filter is also known. According to this process, a coarse core layer of relatively large diameter polymer fibers are initially applied directly onto a spinning mandrel to form an inner cylindrical fiber mass. Finer polymer fibers are applied over the inner cylindrical mass to form the depth filter element. The fiber mass forming the depth filter element is continuously advanced along and off of the mandrel by a press roller located adjacent to the mandrel. The inner fiber mass of such a coreless depth filter provides sufficient structural integrity to support an outer mass of relatively fine polymer fibers and withstand the fluid pressures to which the depth filter is subjected. The outer fiber mass of the finer polymer fibers, on the other hand, comprises the filtration zone of the depth filter.

Under some circumstances, it is desirable that depth filters be capable of filtering very fine particles (e.g., 1 micron) while allowing fluid under pressure to flow through the filter with a minimum drop in pressure. Depth filters with an initial pressure drop in the range of 3–4 p.s.i.d. per gallon per minute of liquid flow per ten inch element are known.

There continues to be a need in the art for a method of continuously producing a depth filter element for use with a core member which yields a suitable depth filter capable of filtering particles 1 micron or less with a minimum pressure drop.

BRIEF SUMMARY OF THE INVENTION

The present invention is directed to a composite polymer filament mass especially suitable for use in constructing a cylindrical depth filter element. In the preferred embodiment, the composite polymer filament mass is comprised of a first cylindrical mass of very small diameter polymer filaments, i.e., diameters of less than about 1.5 microns. An inner cylindrical portion of the first cylindrical mass defines a smooth inner cylindrical surface of the composite filament mass. The first cylindrical mass of filaments is surrounded by a second cylindrical mass of polymer filaments having diameters greater than 1.5 microns.

BRIEF DESCRIPTION OF THE DRAWINGS

FIG. 2 is a schematic diagram illustrating the apparatus configuration for continuously producing a depth filter element of the present invention.

FIG. 2A is an enlarged view of the collection device of the apparatus of FIG. 2.

DETAILED DESCRIPTION OF THE PREFERRED EMBODIMENTS

The present invention relates to an improved non-woven depth filter element as well as an apparatus and a method for continuously making such element. Throughout the specification, the term "coreless" is used to describe certain depth filter elements. Unless otherwise indicated, the term "coreless" refers to a filter element which is not provided with a separate support core member.

Figure 1:
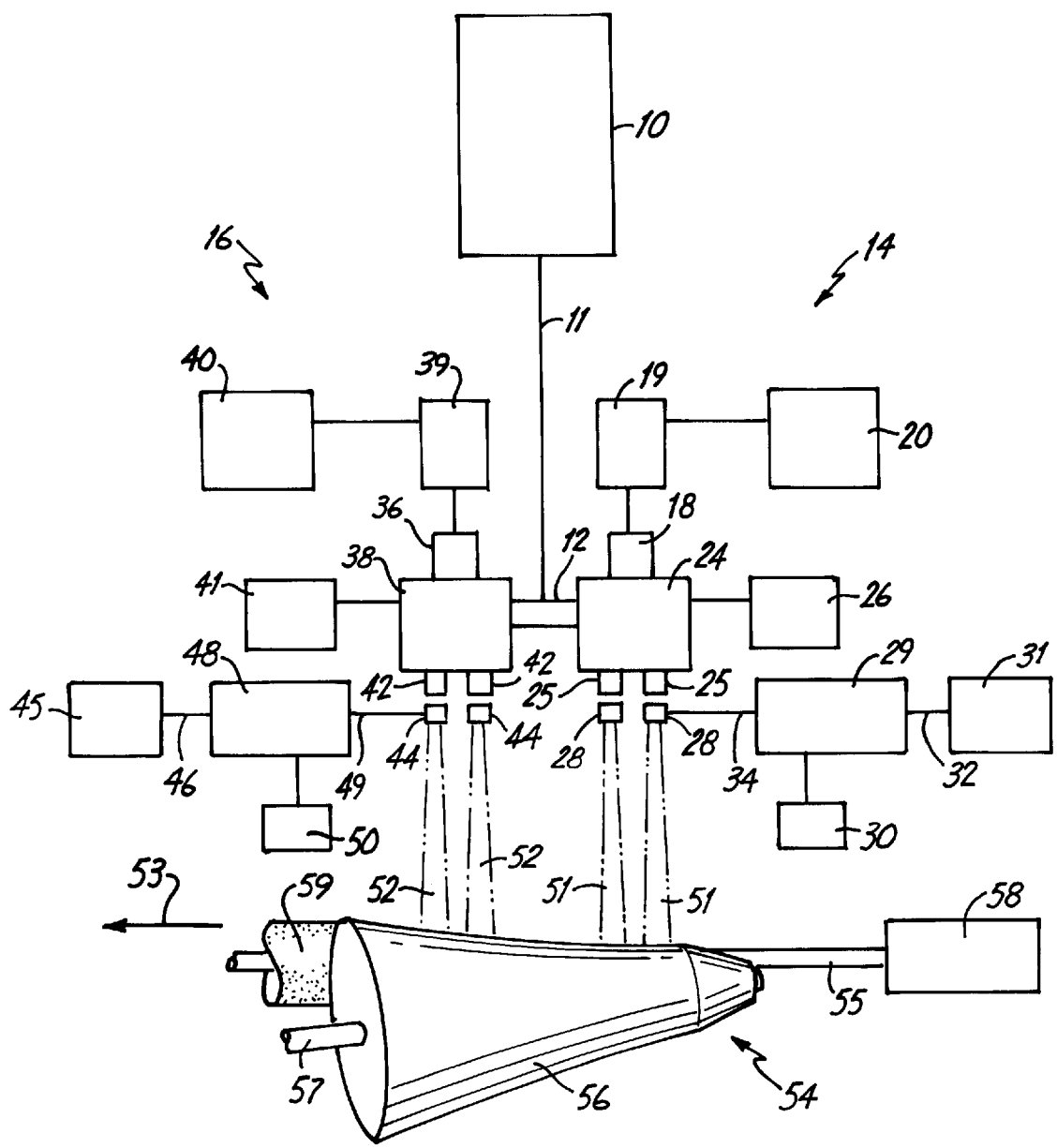
FIG. 1 is a schematic diagram generally illustrating an apparatus for continuously producing a non-woven depth filter element.

Reference is first made to FIG. 1 to generally illustrate an apparatus which is used to continuously manufacture a depth filter element of indefinite length in which the depth filter is comprised of at least two discrete sets of continuous filament material of different diameters or of different materials. One such apparatus suitable for the present invention is disclosed in U.S. Pat. No. 5,340,479, which is fully incorporated herein by reference. The preferred embodiment of the apparatus includes a motor driven screw type extruder 10 which is supplied with thermoplastic polymeric material from a source (not shown). The particular thermoplastic polymeric material maybe any one of a variety of synthetic resinous materials which can produce the filaments used in manufacturing the depth filter element of the present invention. Although the class of polymeric materials known as polypropylenes are preferred, polyesters, Nylon, polyurethanes and other materials may be used as well.

Within the extruder 10, the polymeric material is heated to a molten state, at which time it is metered and conveyed into a heated delivery line 11. The material is maintained or further heated in the line 11 and is ultimately fed into a common manifold 12. The heated molten polymeric material is then directed by the manifold 12 to filament forming means, which in one embodiment is in the form of two filament delivery systems 14 and 16. Each of the delivery systems 14 and 16 is substantially identical and functions to produce one or more substantially continuous polymeric filaments and to direct the same along a predetermined path toward a collection means as will be described in greater detail below.

The filament delivery system 14 includes a motor driven gear type positive displacement metering pump 18 which receives molten polymeric material from the manifold 12 and pumps it to heater block 24. The speed of the motor 19 which drives the metering pump 18, and thus the rate at which the material is metered through the pump 18 is electronically controlled by an appropriate control means 20.

Heater block 24, which is independently heated via heating means (not shown) is provided with internal passages which lead to a plurality of nozzles 25. The heating means, and thus the temperature of the polymeric material within heater block 24, is controlled by temperature control 26. Each nozzle 25 includes an orifice, the size of which may be selected as desired to assist in achieving a desired filament size or diameter. The molten material fed to each nozzle 25 exits the orifice in a stream.

Associated with each nozzle 25 are attenuating mechanisms 28, which comprise a plurality of gas or air jets. Gas flowing out of the attenuating mechanisms 28 function to attenuate the stream of molten material exiting from the nozzles 25 to form polymeric filaments in a manner known in the art. The attenuating mechanisms 28 accordingly may be of any design known in the art including that described in U.S. Pat. No. 4,173,443, the disclosure of which is incorporated herein by reference.

Each of the attenuating mechanisms 28 is associated with a gas heater 29 and gas supply source 31. Gas supply source 31 provides gas via conduit 32 and appropriate valves and regulators to the heater 29 where its temperature is elevated or lowered to the desired temperature via the temperature control 30. The gas is then fed from the heater 29 through conduit 34 to the attenuating mechanisms 28. Attenuating mechanisms 28 may be provided with gas from a common supply source, heater and temperature control, or alternatively, separately controlled gas sources may be employed for each attenuating mechanism 28.

The filament delivery system 16 is substantially identical to that of the system 14 described above. Specifically, the system 16 includes a heater block 38, an independently driven positive displacement metering pump 36, and motor 39 and motor elements 40. Heater block 38 is provided with a plurality of nozzles 42 and temperature control 41. The system 16 is also provided with a plurality of attenuating mechanisms 44 associated with the nozzles 42. Pressurized gas is passed to each attenuating mechanisms 44 from a gas supply source 45 via conduit 46, a heater 48 and conduit 49. Temperature control 50 regulates and controls the temperature produced by heater 48. The provision of separate filament delivery systems 14 and 16 enables separate control and production of polymeric filaments produced by each system 14 and 16.

Each of the delivery systems 14 and 16 is capable of producing a plurality of discrete, continuous filaments 51 and 52 respectively which are directed from the orifices 25 and 42 and attenuating mechanisms 28 and 44, respectively, toward a filament collection device 54 illustrated in FIG. 1. The filament collection device 54 includes a central, rotatable mandrel 55 which extends from a drive motor 58. Adjacent to the mandrel 55 and spaced therefrom is a press roll member 56 rotatable about the axis 57. During operation, the plurality of filaments 51 and 52 are directed in a flared pattern toward the rotating mandrel 55 and collected thereon in a manner known in the art. The rotating press roller 56 engages the filaments which have accumulated on the rotating mandrel 55. As sufficient filaments are built up on the mandrel 55, the press roller 56 forces the filament mass 59 off the axial end of the mandrel 55 in the direction of the arrow 53 to produce a continuous filament mass 59 of indefinite length. The entire filament collection device 54 is known to those skilled in the art and may be similar to that described in U.S. Pat. No. 4,240,864, the disclosure of which is incorporated herein by reference.

The apparatus of FIG. 1 has been demonstrated to be adequate for producing coreless depth filters in which filament delivery system 14 is configured to produce polymeric filaments having relatively large diameters (i.e., greater than 15 microns), and filament delivery system 16 is configured to produce polymeric filaments having smaller diameters (i.e., 1–15 microns). A depth filter element produced thereby has a tubular configuration with an inner-most cylindrical zone of relatively large polymeric filaments which defines a support for an outer cylindrical zone of the smaller polymeric filaments which form a filtration zone of the depth filter. The present invention, however, is directed to an novel apparatus configuration and method for continuously producing an improved depth filter for use with a core member.

The improved depth filter of the present invention is generally characterized by an inner cylindrical mass of very small diameter polymeric filaments (i.e., 0.5–1.5 microns), a calendered (i.e. smooth) inner cylindrical surface and an outer cylindrical mass of coarser, large diameter polymeric filaments (i.e., 4–10 microns or greater). While cored depth filters having a filtration zone near the core are known in the art, production of such filters is discontinuous and requires that the relatively fine polymeric filaments comprising the filtration zone to be deposited directly on a core member supported by a mandrel. The improved apparatus configuration and process of the present invention overcomes the limitations of such a discontinuous depth filter production process by enabling a continuous process whereby very small diameter polymeric filaments (0.5–1.5 microns) are directly applied to and collected on a mandrel of a filament collection device, such as filament collection device 54 shown in FIG. 1, with larger diameter polymeric filaments thereafter applied over the small filament mass. A calendered inner cylindrical surface of the depth filter, comprised of a portion of the mass of very small polymeric filaments, results from this process, which allows for an easy, post-production insertion of a core member known in the art. The process of the present invention therefore enables a continuous production of a depth filter element independent of a core member to be used with the depth filter.

For a more complete understanding of the present invention, reference is made to FIG. 2, which is a schematic diagram illustrating the apparatus of FIG. 1 configured for continuously producing a depth filter element of the present invention. As shown in FIG. 2, four filament producing devices 100, 102, 104, and 106 are employed, each of which comprises a nozzle and an attenuating mechanism, such as nozzle 25 and attenuating mechanism 28 of FIG. 1. Filament producing devices 100, 102, 104, and 106 are longitudinally aligned along a common axis 108 which is parallel with mandrel 110. The nozzle of each filament producing device 100, 102, 104, and 106 includes an orifice which defines an axis 112 that is perpendicular to axis 108 and mandrel 110. Axis 112 generally corresponds to the flow axis of molten polymer exiting the nozzle orifice. In one preferred embodiment, filament producing devices 100, 102, 104, 106 are located approximately 30 inches from mandrel 110. As depicted, the attenuating mechanism of filament producing device 100 is oriented to produce gas streams which are generally aligned and parallel with axis 112. This orientation results in a flared filament pattern 114 being directed toward mandrel 110.

Filament pattern 114 is comprised of polymer filaments having very small diameters of between about 0.5 micron to about 1.5 microns. As a non-limiting example, polymer filaments of filament pattern 114 were produced in the depth filter of the instant invention by passing polypropylene heated to a temperature of 420° C. to about 425° C. through a nozzle having an orifice size of about 0.011 inch at a rate of about 3.8 pounds per hour and passing a heated gas at a temperature of 400° C. at a rate of 11 cubic feet per minute over the molten polymer stream exiting the nozzle orifice. It will be appreciated that a person skilled in the art can readily determine other parameter combinations suitable to form very fine filaments of between about 0.5 microns to about 1.5 microns, and that the parameters necessary to form such very fine filaments will vary according to the particular polymer material used.

The attenuating mechanism of filament producing device 102, however, is oriented to produce gas streams which are directed at an angle, relative to axis 112 of device 102, away from filament pattern 114. By orienting the attenuating mechanism of device 102 in this manner, a flared filament pattern 116 is produced which substantially avoids overlapping with filament pattern 114. The objective of this configuration is to allow polymeric filaments from device 100 to accumulate and form a mass on mandrel 110 with minimal mixing of polymeric filaments from device 102. In one preferred embodiment, the attenuating mechanism of device 102 is oriented to produce gas streams away from filament pattern 114 at an angle of between about 30° to about 40° relative to axis 112 of device 102. In the depth filter of the present invention, the polymer filaments of filament pattern 116 have diameters of between about 4 microns to about 8 microns. By way of a non-limiting example, the filaments of pattern 116 were produced by passing polypropylene heated to a temperature of 420° C. to about 425° C. through a nozzle having an orifice size of about 0.011 inch at a rate of about 3.8 pounds per hour and passing a gas at ambient temperature at a rate of 11 cubic feet per minute over the molten polymer stream exiting the nozzle orifice.

With respect to device 104, the attenuating mechanism is oriented to produce gas streams at an angle directed toward filament pattern 116 to produce a filament pattern 118 which substantially overlaps with filament pattern 116. In one preferred embodiment, the attenuating mechanism of device 104 is oriented to produce gas streams at an angle of between about 5° to about 10° relative to axis 112 of device 104. In the depth filter of the present invention, the polymer filaments of filament pattern 118 have diameters of between about 6 microns to about 10 microns. By way of a non-limiting example, the filaments of pattern 118 were produced by passing polypropylene heated to a temperature of 390° C. through a nozzle having an orifice size of about 0.011 inch at a rate of about 5.1 pounds per hour and passing a gas at ambient temperature at a rate of 11 cubic feet per minute over the molten polymer stream exiting the nozzle orifice.

The attenuating mechanism of device 106 is oriented to produce a gas stream angled toward filament pattern 118. In a preferred embodiment, this orientation results in a gas stream directed at an angle of between about 10° to about 20° relative to axis 112 of device 106. In the described configuration, device 106 produces filament pattern 120, which substantially overlaps filament pattern 118. In the depth filter of the present invention, the polymer filaments of filament pattern 120 have diameters of between about 6 microns to about 10 microns. By way of a non-limiting example, the filaments of pattern 120 were produced by passing polypropylene heated to a temperature of about 390° C. through a nozzle having an orifice size of about 0.016 inch at a rate of about 5.1 pounds per hour and passing a gas at ambient temperature at a rate of 16 cubic feet per minute over the molten polymer stream exiting the nozzle orifice.

As further shown in FIG. 2, filament producing device 100 is oriented such that filament pattern 114 is generally centered on nip 122 of press roller 124. In one embodiment, filament pattern 114 has a width of about 6 to 8 inches at mandrel 110. Filament pattern 116 is intended to be substantially separate from filament pattern 114, with sufficient overlap or intermingling of each pattern, however, to prevent separation or delamination of the filament mass formed. Filament pattern 114 therefore accumulates on mandrel 110 as a generally homogenous filter mass. Filament patterns 116, 118 and 120 are intended to substantially overlap, which results in a relatively heterogenous filament mass being applied over the filament mass produced by filament pattern 114.

As more completely shown in FIG. 2A, which is an enlarged view of the collection device of FIG. 2, an accumulated mass of filaments 114a and 114b from filament pattern 114 are produced on opposite sides of nip 122 of press roller 124. In one embodiment, press roller 124 is oriented at an angle relative to mandrel 110 with nip 122 in contact with mandrel 110. As a non-limiting example, outer surface 123 of press roller 124 is angularly displaced by about 3° relative to mandrel 110. So configured, sufficient filaments from filament pattern 116 are intermixed with those of filament mass 114b that the filament mass 114a is drawn past nip 122 as the collective filament mass 126 is moved along mandrel 110 in the direction indicated by arrow 128. As the filaments from filament mass 114a are drawn past nip 122, they are compressed between nip 122 and mandrel 110 to form a dense layer of the very small diameter filaments produced in filament pattern 114. Because of the small diameter of these filaments, the filaments are able to sufficiently cool in the time it takes for them to accumulate and pass by nip 122. As a result, no cross-welding of filaments results as filament mass 114a is compressed by nip 122. Furthermore, because of the angular placement of press roller 124, compression of filaments in collective filament mass 126 varies along the length of press roller 124. This results in a filament mass having a varying density gradient, with the filament density of filament pattern 114 being generally greater than that of the filament mass comprised of filament patterns 116, 118 and 120. A filament mass of the present invention may be formed in any desirable lengths and subsequently cut to any desirable size to form discrete depth filter elements.

It was originally believed that very fine polymer filaments of less than 1.5 microns could not be successfully applied to a collection mechanism employing a spinning mandrel and press roller without roping of the filaments or sticking to the mandrel. It was also not expected that a smooth calendered inner cylindrical surface would result to a filament mass produced from the method of the present invention. Rather, it was anticipated that a continuous process as described would produce a surface defined by fine, fuzzy filaments, which could hamper insertion of a core member. The method of the present invention, however, demonstrates a way of continuously producing at an advantageous rate a filament mass suitable for making a depth filter element having an inner filtration zone comprised of very fine filaments and an outer filtration zone comprised of larger filaments, and which produces a smooth inner cylindrical surface that allows for subsequent easy insertion of a core member.

Figure 3:
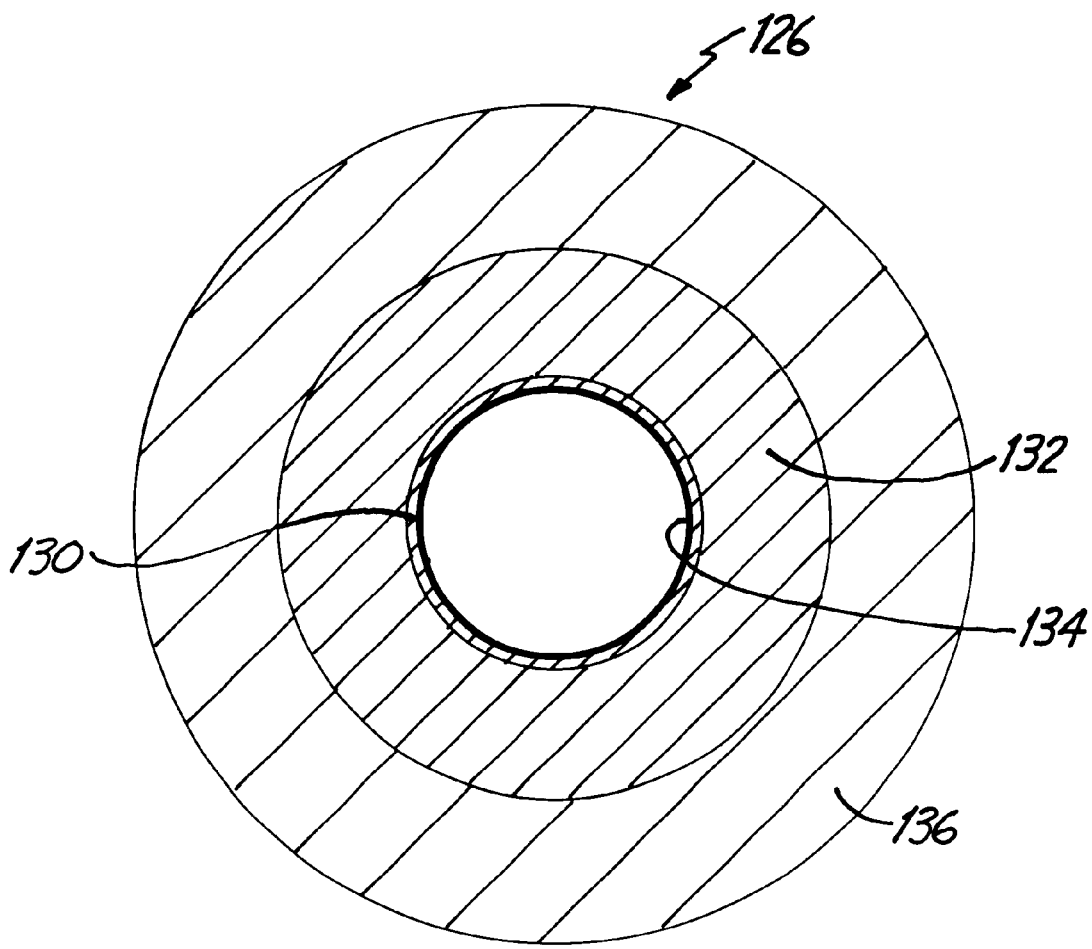
FIG. 3 is a cross-sectional view of a depth filter element of the present invention.

FIG. 3 illustrates a cross-sectional view of the filament mass 126 produced by the present invention. As generally depicted, filament mass 126 is comprised of an inner cylindrical calendered layer 130, which is contiguous with an inner filtration zone 132 comprised of a relatively homogenous zone of very fine polymer filaments have diameters of less than about 1.5 microns, and generally in a range of between about 0.5 micron and 1.5 microns. Calendered layer 130 results from the compression of filaments having the same morphology and size as those found in filtration zone 132. In one embodiment, calendered layer has a thickness of about 5 mils which defines a smooth inner cylindrical surface 134 of filament mass 126. Filament mass 126 is further comprised of an outer filtration zone 136 formed by a heterogenous filament mass having intermixed filaments having diameters ranging in size from about 4 microns to about 10 microns. In one embodiment, filament mass 126 has a mass of 110 grams per ten inch section.

Depth filter elements formed in the manner described relative to FIGS. 1, 2 and 2A and having the characteristics described relative to FIG. 3 have demonstrated excellent particle filtration and fluid throughput capabilities. For example, the depth filter of the present invention has demonstrated to be 99.9% effective at removing 1 micron particles. Furthermore, the depth filter element of the present invention allows fluid throughput with a minimal drop in fluid pressure across the filter (e.g. pressure drops of about 1.5 p.s.i.d. per gallon per minute of liquid flow per ten inch element).

Although the description of the preferred embodiment and method has been quite specific, it is contemplated that various modifications could be made without deviating from the spirit of the present invention. Accordingly, it is intended that the scope of the present invention be dictated by the appended claims rather than by the description of the preferred embodiment.

What is claimed is:

1. A composite filament mass for use in constructing a depth filter element, the composite filament mass comprising:

a first cylindrical mass of essentially continuous, intertwined, and thermally bonded polymer filaments, the polymer filaments of the first cylindrical mass having diameters of less than about 1.5 microns; wherein the first cylindrical mass comprises a first filament zone and a second filament zone, the first filament zone defining a calendered layer having a density of filaments which is substantially greater than that of the second filament zone; the calendered layer defining a smooth inner cylindrical surface of the composite filament mass; and a second cylindrical mass of essentially continuous, intertwined, and thermally bonded polymer filaments surrounding the first cylindrical mass of polymer filaments, the polymer filaments of the second cylindrical mass having diameters greater than about 1.5 microns, wherein the diameter of the polymer filaments in each cylindrical mass is less than the diameter of the polymer filaments in each surrounding cylindrical mass.

2. The composite filament mass of claim 1 wherein the first filament zone defines a calendered layer of filaments having a thickness of about 5 mils, and wherein the second filament zone and the second cylindrical mass are each substantially thicker than about 5 mils.

3. The composite filament mass of claim 1 wherein the filaments of the first filament mass have diameters of less than about 1 micron.

4. The composite filament mass of claim 1 wherein at least some polymer filaments from the first filament mass are intertwined and thermally bonded with polymer filaments from the second filament mass.

5. The composite filament mass of claim 1 wherein the second filament mass comprises polymer filaments having diameters ranging from about 4 microns to about 10 microns.

* * * * *